(12) United States Patent
Kawamura et al.

(10) Patent No.: US 8,882,139 B2
(45) Date of Patent: Nov. 11, 2014

(54) HEAD PROTECTION AIRBAG APPARATUS

(71) Applicant: Toyoda Gosei Co., Ltd., Kiyosu (JP)

(72) Inventors: Koji Kawamura, Kiyosu (JP); Wataru Miura, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 14/190,167

(22) Filed: Feb. 26, 2014

(65) Prior Publication Data
US 2014/0239621 A1 Aug. 28, 2014

(30) Foreign Application Priority Data

Feb. 28, 2013 (JP) .................................. 2013-039157

(51) Int. Cl.
*B60R 21/16* (2006.01)
(52) U.S. Cl.
USPC ........................................................ 280/730.2
(58) Field of Classification Search
CPC .. B60R 21/213; B60R 21/232; B60R 21/233; B60R 2021/0048; B60R 2021/23192; B60R 2021/23316; B60R 2021/23324
USPC ............................................. 280/730.2, 729
See application file for complete search history.

(56) References Cited

U.S. PATENT DOCUMENTS

| 6,481,743 | B1 * | 11/2002 | Tobe et al. ................. 280/728.2 |
| 7,500,694 | B2 * | 3/2009 | Heudorfer et al. ............ 280/729 |
| 7,641,228 | B2 * | 1/2010 | Mansson et al. ........... 280/730.2 |
| 7,967,332 | B2 * | 6/2011 | Karlsson .................... 280/730.2 |
| 7,988,187 | B2 | 8/2011 | Yamamura et al. |
| 8,020,888 | B2 * | 9/2011 | Cheal et al. ................ 280/730.2 |
| 8,651,515 | B2 * | 2/2014 | Baba et al. ................. 280/730.2 |
| 2003/0178831 | A1 * | 9/2003 | Roberts et al. ............. 280/743.1 |
| 2004/0232666 | A1 * | 11/2004 | Sato et al. .................. 280/730.2 |
| 2006/0061071 | A1 * | 3/2006 | Noguchi et al. ........... 280/730.2 |
| 2012/0235388 | A1 * | 9/2012 | Suzuki ....................... 280/730.2 |
| 2013/0001933 | A1 * | 1/2013 | Umehara et al. ........... 280/730.2 |

FOREIGN PATENT DOCUMENTS

JP  2010-036805 A  2/2010

* cited by examiner

*Primary Examiner* — Faye M. Fleming
(74) *Attorney, Agent, or Firm* — Posz Law Group, PLC

(57) ABSTRACT

A head protection airbag apparatus includes an airbag that is folded and received in an upper edge of a window on an inside of a vehicle, an upper edge of which is attached and fixed to a body of the vehicle, and inflated and protruding downward from a storage region by an inflation gas flowed from an inflator to cover the inside of the window. The air bag includes an inflation shielding section that is arranged to cover the inside of the window upon completion of inflation and an overlap inflation section that is communicated with the inflation shielding section and arranged on an inside or an outside with respect to the vehicle of the inflation shielding section so that an inflation region of the overlap inflation section is overlapped with an inflation region of the inflation shielding section.

6 Claims, 9 Drawing Sheets

HEAD PROTECTION AIRBAG APPARATUS

CROSS-REFERENCE TO RELATED APPLICATION

This application is based on Japanese Patent Application No. 2013-039157 filed on Feb. 28, 2013, the contents of which are incorporated herein by reference.

BACKGROUND OF THE INVENTION

1. Technical Field

The present invention relates to a head protection airbag apparatus, including an airbag adapted to be folded and received in an upper edge of a window on an inside of a vehicle, to be attached and fixed, at an upper edge thereof, to a body of the vehicle, and to inflated to cover the inside of the window while protruding downward from a storage region by an inflation gas flowed from an inflator thereinto.

2. Background Art

Conventionally, as a head protection airbag apparatus, one is known in which, in order to restrain and protect an occupant on an inside of a vehicle even upon a rollover of the vehicle occurred after a side collision thereof, an airbag includes an inflation shielding section inflated to cover the inside of a window and configured to locate a lower edge thereof below a belt line, and a reinforcement inflation section adapted to be swelled in a rod shape along a front and rear direction on the inside or the outside of the lower edge of the inflation shielding section upon completion of inflation (e.g., see JP-A-2010-36805).

According to the conventional head protection airbag apparatus, upon completion of inflation, the lower edge of the inflation shielding section is located below the belt line and supported by a member constituting the belt line, thereby achieving an ability of restraining the head of the occupant upon a rollover. However, dimensions in an upward and downward direction have to be set so that the lower edge can be securely supported by the member constituting the belt line upon a rollover, and accordingly, there is room for improvement in terms of increasing the degree of freedom in design.

Accordingly, in order to solve the above matters, an object of the present invention is to provide a head protection airbag apparatus, in which, upon a rollover of a vehicle, an occupant is prevented from being moved toward the outside even if a lower edge thereof upon completion of inflation is not located below a belt line, thereby accurately restraining the occupant on the inside.

SUMMARY

According to an aspect of the invention, a head protection airbag apparatus includes an airbag that is folded and received in an upper edge of a window on an inside of a vehicle, an upper edge of which is attached and fixed to a body of the vehicle, and inflated and protruding downward from a storage region by an inflation gas flowed from an inflator to cover the inside of the window. The air bag includes an inflation shielding section that is arranged to cover the inside of the window upon completion of inflation and an overlap inflation section that is communicated with the inflation shielding section and when the airbag is completely inflated, arranged on an inside or an outside of the vehicle of the inflation shielding section so that an inflation region of the overlap inflation section is overlapped with an inflation region of the inflation shielding section inflated by the inflation gas. The overlap inflation section is configured to be completely inflated after the inflation shielding section is completely inflated. The overlap inflation section has a generally rod-shaped exterior shape and is arranged to extend substantially along a front and rear direction on a substantially middle region of the inflation shielding section in an upward and downward direction. The overlap inflation section is arranged to be overlapped with a pillar arranged adjacent to the window, as viewed from the inside of the vehicle.

According to the above head protection airbag apparatus of the present invention, when the airbag has been completely inflated, the overlap inflation section is arranged on the inside or the outboard of the inflation shielding section so that an inflation region thereof is overlapped with an inflation region of the inflation shielding section, and the overlap inflation section has a generally rod-shaped exterior shape and is arranged to extend substantially along the front and rear direction on a substantially middle region of the inflation shielding section in the upward and downward direction. Namely, in the head protection airbag apparatus of the present invention, the inflation shielding section is inflated so that the middle region thereof in the upward and downward direction is substantially thickly inflated by arranging the overlap inflation section thereon. Also, because the overlap inflation section is inflated in the rod shape and arranged substantially along the front and rear direction, the overlap inflation section becomes an aspect having rigidity and thus is not easily bended even when supporting a head of an occupant. In addition, because the overlap inflation section is arranged to be overlapped with the inside of the pillar arranged adjacent to the window, the outside thereof can be supported by the pillar indirectly with the inflation shielding section interposed therebetween or directly without interposing the inflation shielding section therebetween, when supporting the head of the occupant. Further, because the overlap inflation section is configured to be completely inflated after the inflation shielding section has been completely inflated, upon a rollover, in which a timing of supporting the occupant is relatively slow, the head of the occupant moving toward the outside is accurately restrained over a wide area in the front and rear direction by the overlap inflation section arranged in the rod shape along the front and rear direction with the outside thereof supported by the pillar. Therefore, the head protection airbag apparatus of the embodiment can accurately restrain the head of the occupant upon a rollover, even if the lower edge thereof upon completion of inflation is not located below the belt line.

Accordingly, the head protection airbag apparatus of the present invention can prevent the occupant from being moved toward the outside upon a rollover of the vehicle even if the lower edge thereof upon completion of inflation is not located below the belt line, thereby accurately restraining the occupant on the inside.

Also, according to the head protection airbag apparatus of the present invention, if, when the airbag has been completely inflated, the overlap inflation section is arranged to be overlapped with two pillars respectively arranged adjacent to the front and rear of the window as viewed from the inside, it is preferable because the outside of the overlap inflation section can be supported on two regions, which are spaced from each other in the front and rear direction, by the pillars arranged in the front and rear, and thus upon a rollover, the head of the occupant can be more accurately restrained by the overlap inflation section.

Further, in the head protection airbag apparatus according to the above configuration, if the overlap inflation section is arranged over the substantially entire region of the inflation shielding section in the front and rear direction, it is preferable because when the airbag has been completely inflated, the overlap inflation section, which is swelled in a rod shape and has rigidity, is arranged to be overlapped over the entire length in the front and rear direction of the inflation shielding section covering the inside of the window, and thus an ability of restraining the occupant head can be more enhanced.

Further, in the head protection airbag apparatus according to the above configuration, preferably, an airbag constitution body constituting the airbag may be configured so that, in a flatly deployed state thereof, the overlap inflation section is arranged adjacent to a lower side of the inflation shielding section to extend substantially along the front and rear direction, and the overlap inflation section may be communicated with the inflation shielding section through a communication part, and folded back at the communication part to be arranged on the inside or the outside of the inflation shielding section.

If the head protection airbag apparatus has the above configuration, because the overlap inflation section is folded back at the communication part so that it is difficult for the inflation gas to move between the inflation shielding section and the overlap inflation section, the start of inflation of the overlap inflation section can be securely delayed from the start of inflation of the inflation shielding section. Also, because the folded part itself can serve as a non-return valve, once the inflation gas is flowed into the overlap inflation section, the inflation gas can hardly move toward the inflation shielding section. Therefore, upon a rollover, an internal pressure of the overlap inflation section can be sufficiently achieved, and even if an internal pressure of the inflation shielding section is decreased, the head of the occupant can be accurately restrained by the overlap inflation section.

In the above head protection airbag apparatus, the inflation shielding section includes a main inflation portion and a sub-inflation portion communicated with the main inflation portion to be completely inflated after the main inflation portion is completely inflated, the overlap inflation section is communicated with the sub-inflation portion, and a downstream-side communication part for communicating the overlap inflation section with the sub-inflation portion is set to have an opening area smaller than that of an upstream-side communication part for communicating the sub-inflation portion with the main inflation portion.

If the head protection airbag apparatus has the above configuration, when upon a side collision the head of the occupant is supported by the main inflation portion completely inflated, the inflation gas therein is discharged to the sub-inflation portion to prevent an internal pressure of the main inflation portion from being increased, and as a result, the main inflation portion has an adequate reaction force, thereby accurately supporting the head of the occupant. Also, because the downstream-side communication part for communicating the overlap inflation section with the sub-inflation portion is set to have an opening area smaller than that of the upstream-side communication part for communicating the sub-inflation portion with the main inflation portion, even when the inflation gas is flowed into the sub-inflation portion upon a side collision, the inflation gas, which has been flowed into the sub-inflation portion, can be prevented from being immediately flowed into the overlap inflation section, so that the start of inflation of the overlap inflation section can be securely delayed from the start of inflation of the sub-inflation portion.

DESCRIPTION OF PREFERRED EMBODIMENT

Figure 1:
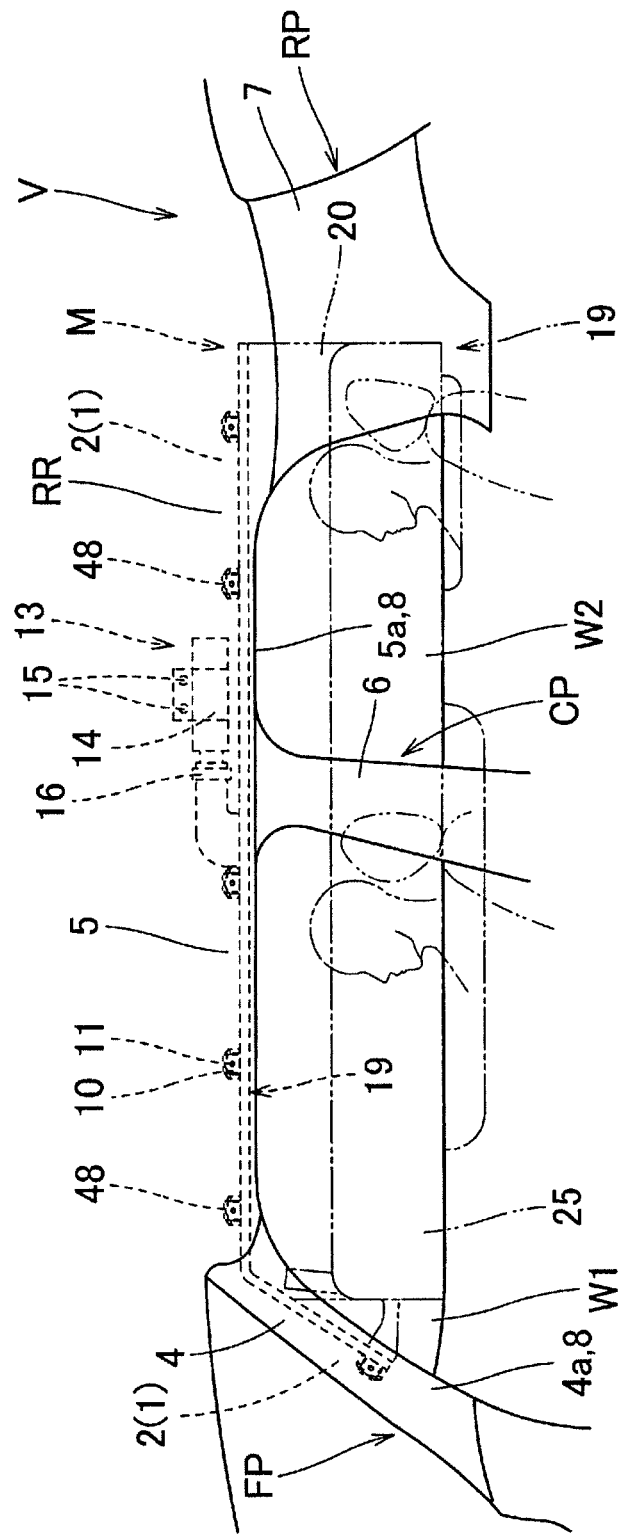
FIG. 1 is a schematic front view showing a head protection airbag apparatus according to one embodiment of the present invention, as viewed from the inside of a vehicle.

One embodiment of the present invention will be now described with reference to the accompanying drawings. As shown in FIG. 1, a head protection airbag apparatus M according to the embodiment is mounted in a two-row seat type vehicle V having two windows (side windows) W1 and W2. The head protection airbag apparatus M according to the embodiment includes an airbag 19, an inflator 13, attaching brackets 10 and 14, and an airbag cover 8. The airbag 19, as shown in FIG. 1, is folded and received in upper edges of windows W1 and W2 on the inside of the vehicle V to extend from a lower edge of a front pillar FP to an upper region of a rear pillar RP, via a lower edge of a roof side rail RR.

As shown in FIG. 1, the airbag cover 8 is constituted of a lower edge 4a of a front pillar garnish 4 arranged on the front pillar FP, and a lower edge 5a of a roof head liner 5 arranged on the roof side rail RR. The front pillar garnish 4 and roof head liner 5, which are made of synthetic resin, are respectively attached and secured to the inside of an inner panel 2 of a body 1 at the front pillar FP and the roof side rail RR. The airbag cover 8 is arranged to cover the inside of the folded and received airbag 19 and is configured to be pushed by the airbag 19 and opened to an interior I of the vehicle, so that upon deployment and inflation, the airbag 19 can protrude to the interior I (see FIGS. 6 and 7).

As shown in FIG. 1, the inflator 13, which is intended to supply an inflation gas to the airbag 19, is of a cylinder type having a generally circular cylindrical shape, and is provided, on a distal end thereof, with a gas discharging port (not shown) for discharging the inflation gas. The inflator 13 is adapted so that the distal end side thereof including the gas discharging port region is inserted into a connector part 34, as described below, of the airbag 19. Thus, the inflator 13 is connected to the airbag 19 using a clamp 16 arranged on an outer periphery of a rear end 34*a* of the connector part 34. Also, the inflator 13 is attached to a location on the inner panel 2, which corresponds to an upper side of the window W2, using the attaching bracket 14 for holding the inflator 13 and bolts 15 for fixing the attaching bracket 14 to the inner panel 2 of the body 1. The inflator 13 is electrically connected to a control device (not shown) of the vehicle V via a lead (not shown) and is configured to be activated by an activation signal inputted from the control device when the control device detects a side collision or a rollover of the vehicle V.

Figure 6:
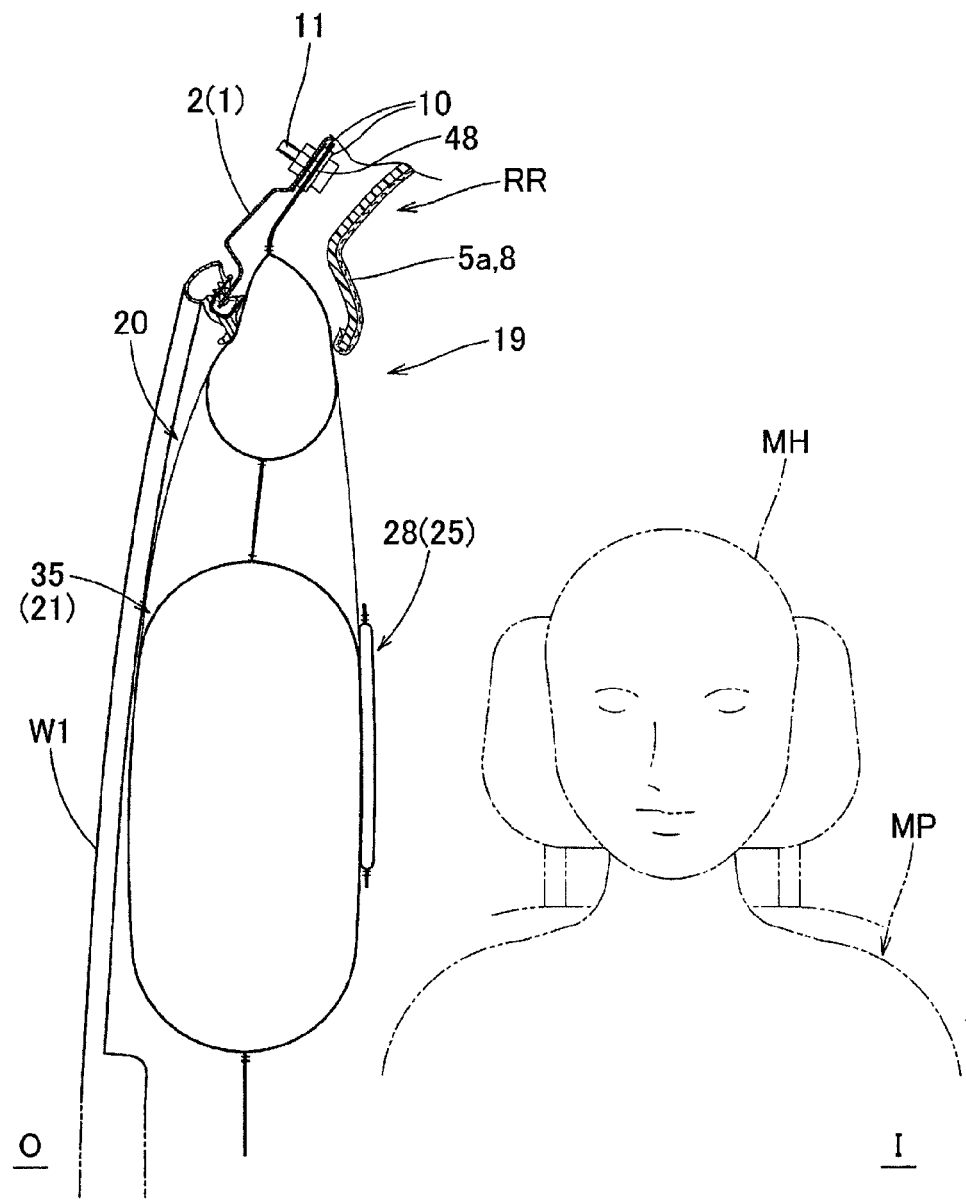
FIG. 6 is a schematic longitudinal sectional view along a left and right direction (an inside and outside direction) showing a state where upon a side collision an inflation shielding section of the airbag is inflated in the head protection airbag apparatus according to the embodiment.
Figure 7:
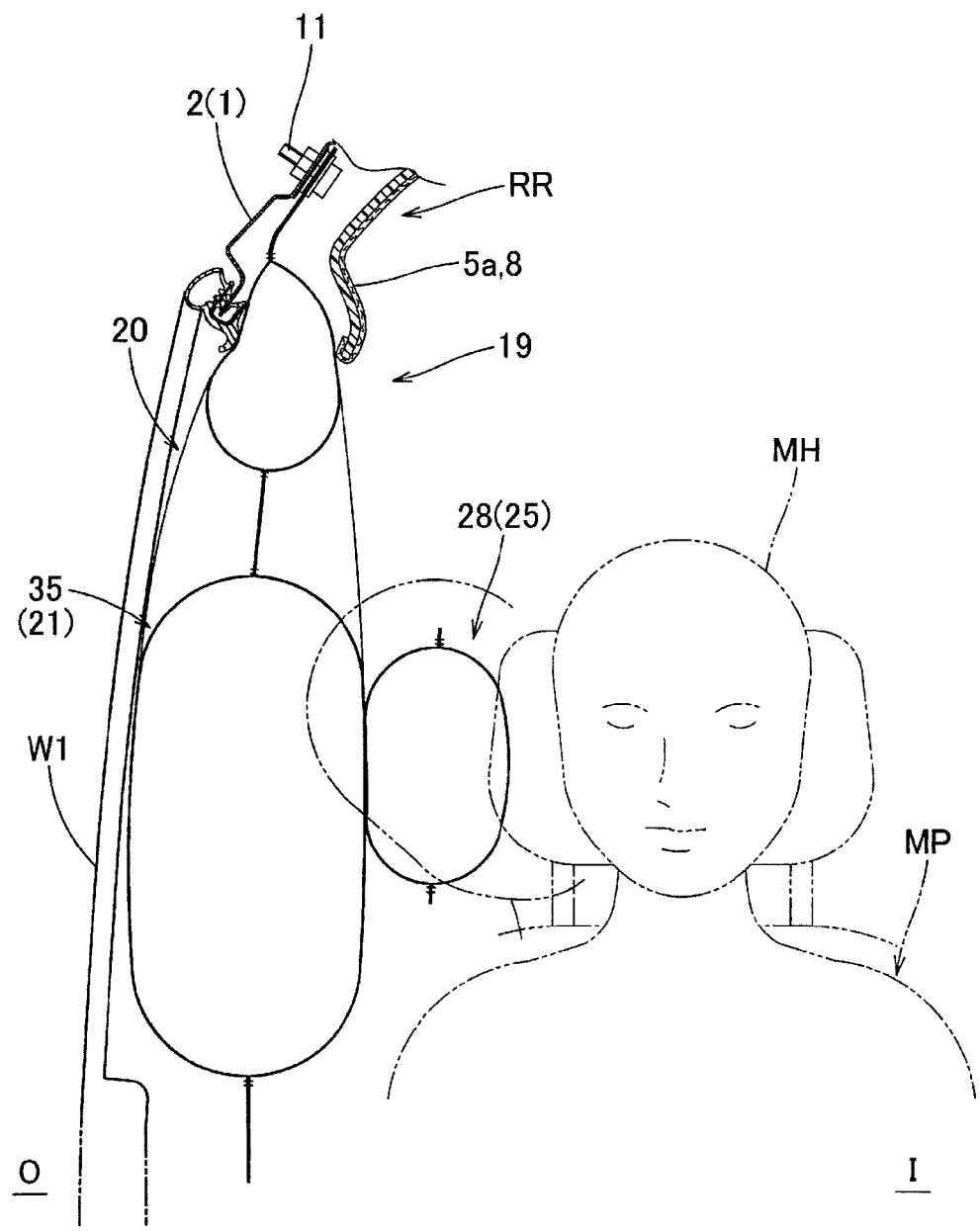
FIG. 7 is a schematic longitudinal sectional view along a left and right direction showing a state where the overlap inflation section is inflated after the inflation shielding section has been completely inflated in the head protection airbag apparatus according to the embodiment.

Each of attaching brackets 10 is made of two metal sheet plates, and as shown in FIGS. 6 and 7, is attached to each of attaching parts 48, as described below, of the airbag 19 with each of attaching parts 48 disposed therebetween and then attaches and fixes each of attaching parts 48 to the inner panel 2 using an attaching bolt 11.

Figure 3:
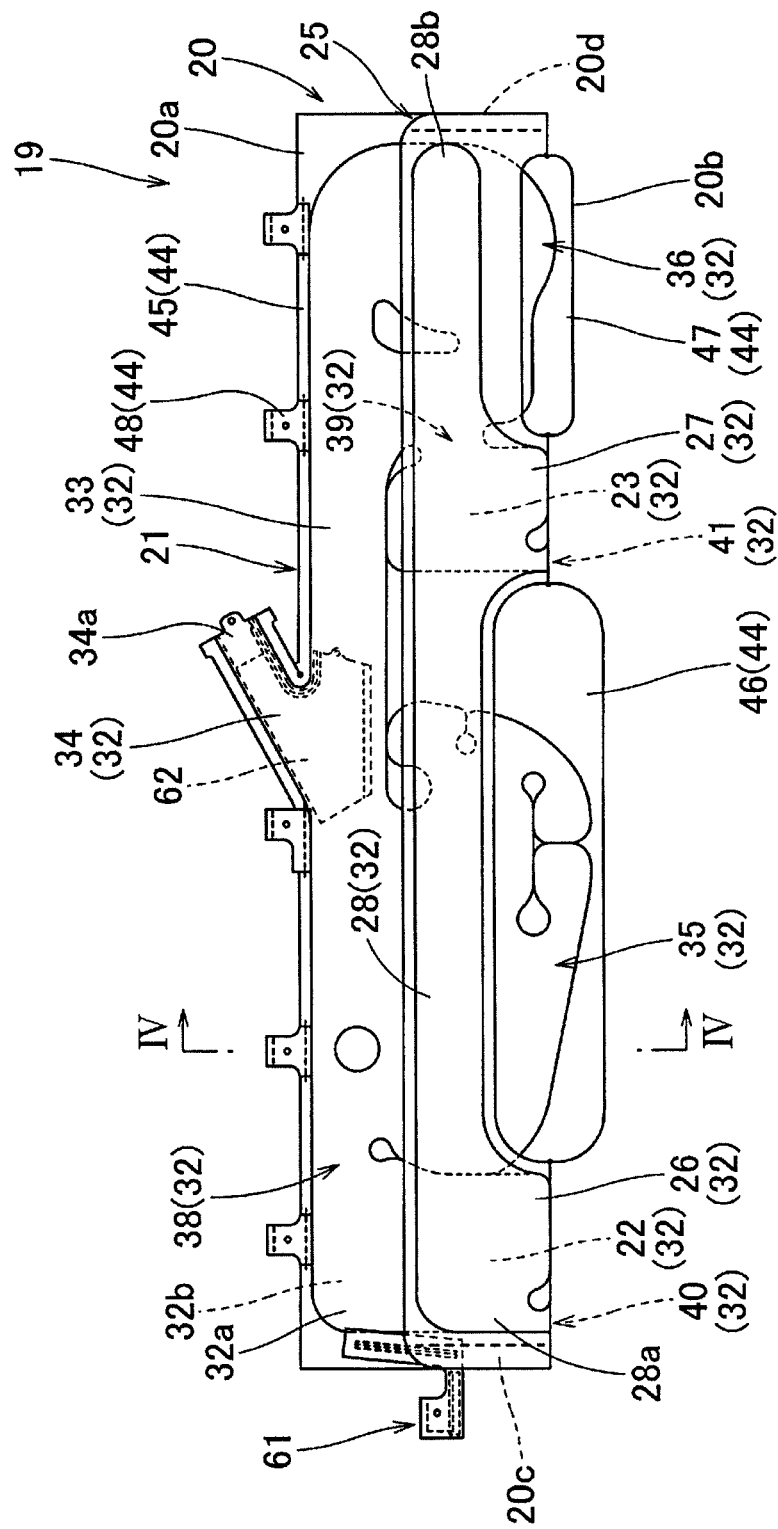
FIG. 3 is a front view showing, in a flatly deployed state, the airbag formed by folding an overlap inflation section of the airbag constitution body of FIG. 2.
Figure 4:
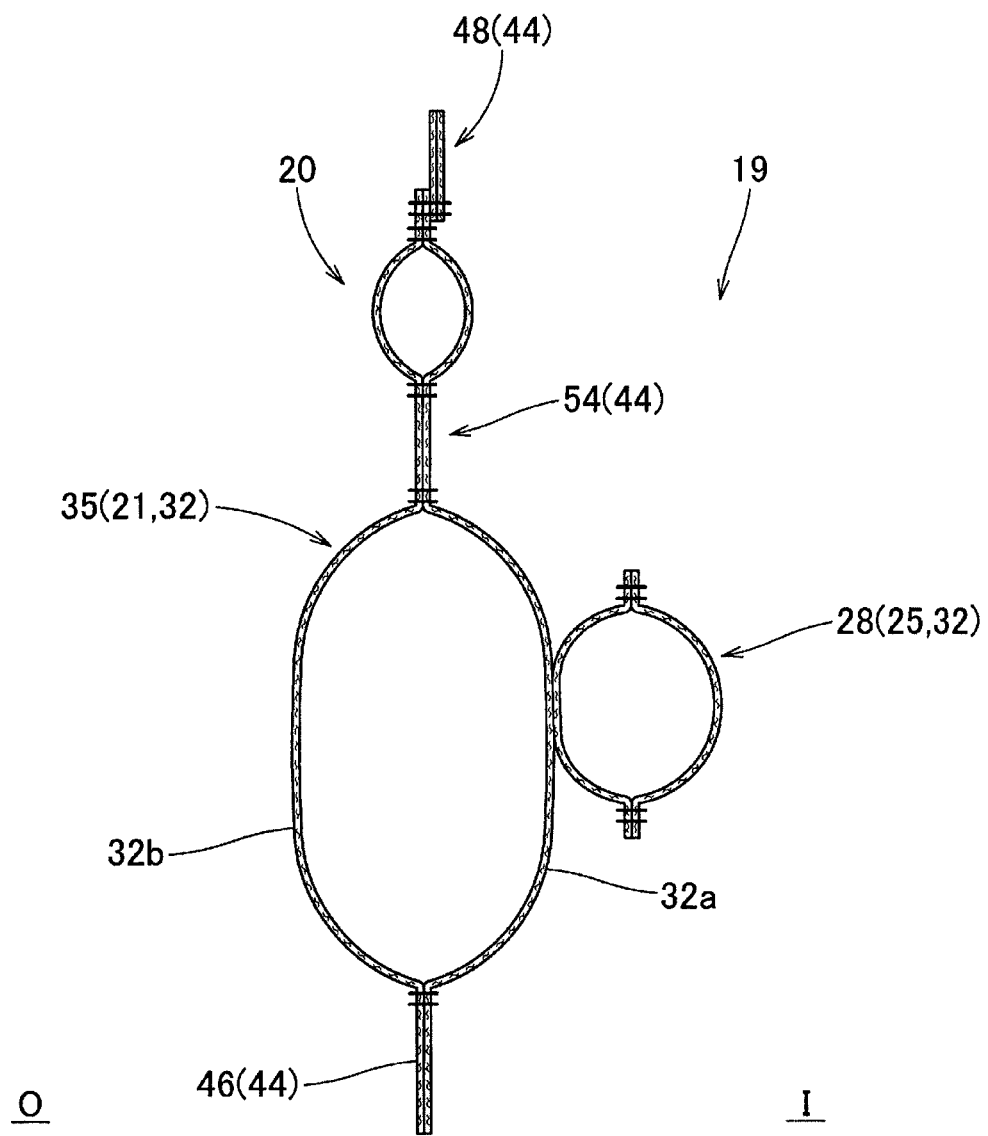
FIG. 4 is a schematic sectional view showing a state where the airbag of FIG. 3 is inflated as a unitary body, corresponding to a section taken along a line IV-IV in FIG. 3.
Figure 5:
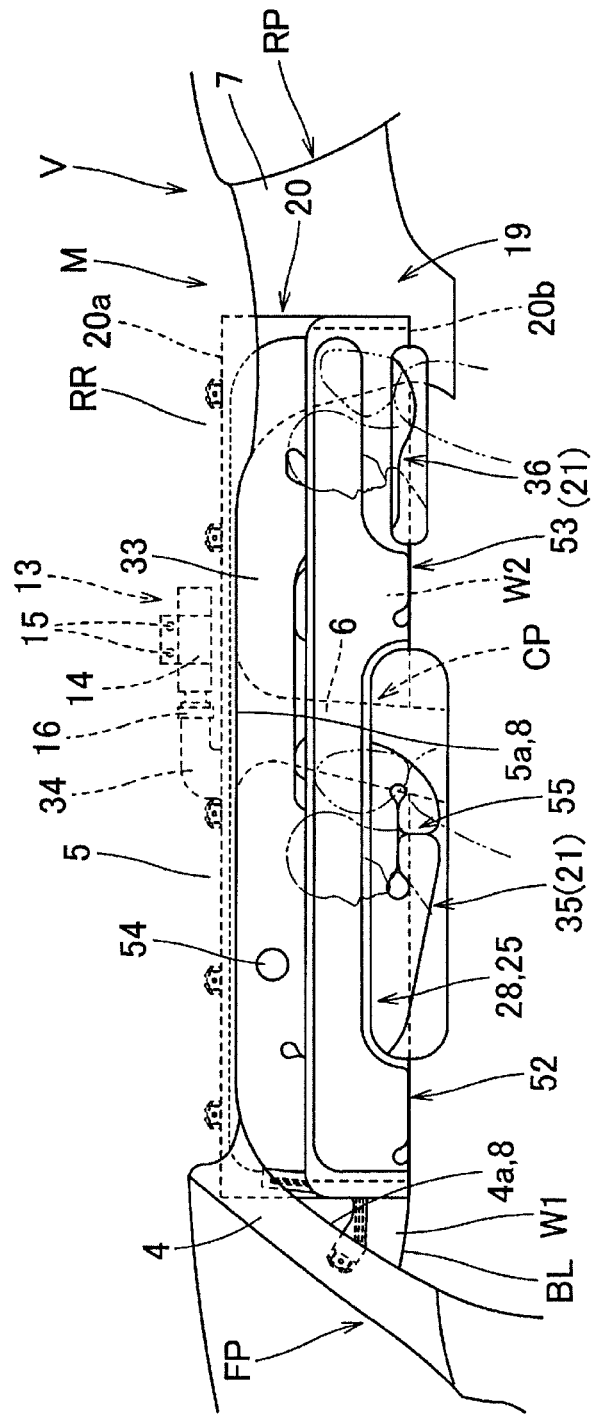
FIG. 5 is a schematic front view, as viewed from the inside, showing a state where the airbag has been completely inflated in the head protection airbag apparatus according to the embodiment.

As shown in FIGS. 1 and 5, the airbag 19 is deployed from the folded state by the inflation gas flowed from the inflator 13 thereinto and thus inflated to cover the insides of the windows W1 and W2 and pillar garnishes 6 and 7 of a center pillar CP and the rear pillar RP. Specifically, the airbag 19 is inflated to cover the inside of a region extending to a substantially front half of the pillar garnish 7 of the rear pillar RP. Upon completion of inflation, the airbag 19, as shown in FIGS. 3 to 5, includes an inflation shielding section 20 for covering the insides of the windows W1 and W2 and an overlap inflation section 25 arranged on the inside of the inflation shielding section 20. The inflation shielding section 20 is configured so that an inflation completion shape thereof becomes a generally rectangular plate shape with a longitudinal direction thereof extending along a front and rear direction, thereby allowing the inflation shielding section 20 to cover the inside of a region extending from the windows W1 to the substantially front half of the rear pillar RP via the center pillar CP and the windows W2 when the airbag 19 has been completely inflated (see FIG. 5). Also, in the embodiment, the inflation shielding section 20, as shown in FIG. 5, has a width dimension in an upward and downward direction set to allow a lower edge 20*b* thereof upon completion of inflation to substantially coincide with a belt line BL formed by lower edges of the windows W1 and W2.

The inflation shielding section 20 includes a main inflation portion 21 (primary inflation portion) inflated by the inflation gas discharged from the inflator 13 thereinto, and front and rear sub-inflation portions 22 and 23 (secondary inflation portions) communicated with the main inflation portion 21 and completely inflated after inflation of the main inflation portion 21 has been completed. In addition, the overlap inflation section 25, as a tertiary inflation portion, is adapted to be inflated next to the main inflation portion 21 (primary inflation portion), and front and rear sub-inflation portions 22 and 23 (secondary inflation portions).

Figure 2:
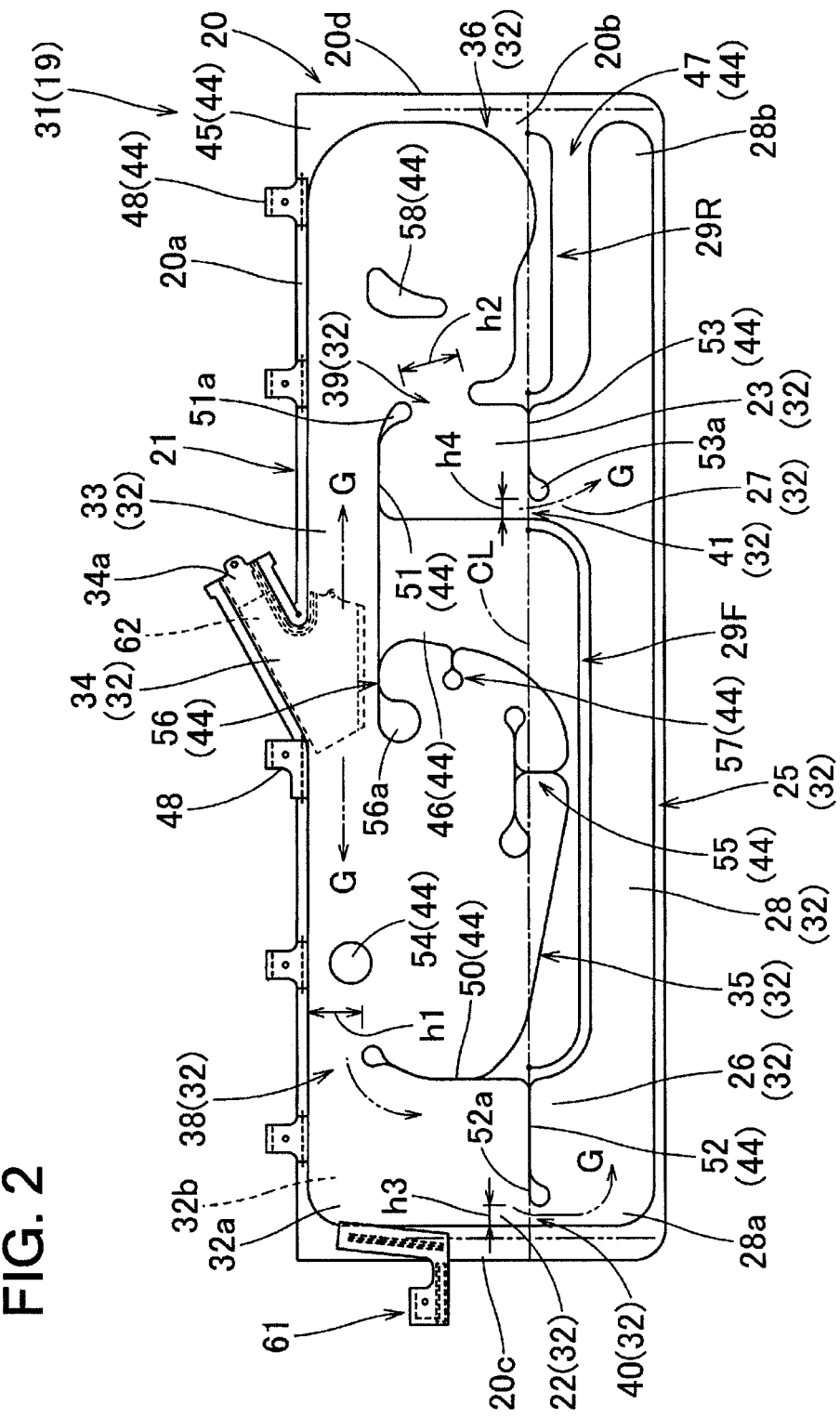
FIG. 2 is a front view showing, in a flatly deployed state, an airbag constitution body constituting an airbag used in the head protection airbag apparatus according to the embodiment.

In the embodiment, the airbag 19, as shown in FIG. 2, is formed of an airbag constitution body 31 in which the overlap inflation section 25 is disposed below the inflation shielding section 20 in a flatly deployed state. Specifically, the airbag constitution body 31 has a generally rectangular exterior shape, including a section of the overlap inflation section 25, except that the connector part 34 constituting the main inflation portion 21 of the inflation shielding section 20 protrudes upward from the substantial center of an upper edge thereof in the front and rear direction. Also, the airbag constitution body 31 has slits 29F and 29R respectively arranged on a region between the front sub-inflation portion 22 and the rear sub-inflation portion 23 and on a region in the rear of the rear sub-inflation portion 23 (i.e., regions of plate-shaped parts 46 and 47 as described below), above a overlap section body 28, as described below, of the overlap inflation section 25, thereby allowing the overlap section body 28 to be separated from the main inflation portion 21 (i.e., a front seat protection part 35, a gas guide flow path 33, and a rear seat protection part 36). The overlap inflation section 25 is configured so that the overlap section body 28 is arranged over the entire region of the inflation shielding section 20 in the front and rear direction. Also, in a state where the airbag constitution body 31 is flatly deployed, the overlap inflation section 25 is folded back at downstream-side communication parts 40 and 41 respectively arranged in conduit parts 26 and 27, which are formed to protrude upward from a front end thereof and from a location, which is located slightly in rear of the center thereof in the front and rear direction, so that a front end 28*a* and a rear end 28*b* of the overlap section body 28 are respectively connected (stitched) to a front edge 20*c* and a rear edge 20*d* of the inflation shielding section 20 to be overlapped with a gas inflow section 32 (inflation region) of the inflation shielding section 20 which is inflated by the inflation gas flowed thereinto, and thus the overlap inflation section 25 is arranged on the inside I of the inflation shielding section 20 (see FIGS. 3 and 4).

In the embodiment, the airbag constitution body 31 is fabricated by stitching two sheets of coated fabrics, in which a coating agent for preventing gas leakage is applied on a surface of a woven fabric woven by polyamide yarn, polyester yarn or the like, to each other using a stitching thread. As shown in FIGS. 2 to 4, the airbag 19 (the airbag constitution body 31) is constituted of the gas inflow section 32, which is adapted to allow an inside wall 32*a* thereof located on the inside I upon completion of inflation and an outside wall 32*b* located on an outside O to be separated from each other and thus is inflated by the inflation gas G flowed from the inflator 13 thereinto, and a non-inflow section 44, into which the inflation gas is not flowed.

The gas inflow section 32 includes the gas guide flow path 33, the connector part 34, the front seat protection part 35 and the rear seat protection part 36, which constitute the main inflation portion 21 of the inflation shielding section 20; the front sub-inflation portion 22; the rear sub-inflation portion 23; the overlap inflation section 25; upstream-side communication parts 38 and 39 for communicating the main inflation portion 21 with each of the front sub-inflation portion 22 and the rear sub-inflation portion 23; and the downstream-side communication parts 40 and 41 for communicating each of the front sub-inflation portion 22 and the rear sub-inflation portion 23 with the overlap inflation section 25. In addition, as shown in FIGS. 3 and 4, because the overlap inflation section 25 is mounted on the vehicle V in a folded back state with respect to the inflation shielding section 20 to be located on the inside I of the inflation shielding section 20, the overlap inflation section 25 when the airbag 19 has been completely inflated is arranged so that a wall thereof arranged to be continued from the inside wall 32*a* of the inflation shielding section 20 is located on the outside.

The gas guide flow path 33 is arranged over the substantially entire region of the main inflation portion 21 in the front and rear direction to extend substantially along the front and rear direction on the upper edge 20*a* of the inflation shielding section 20, and is configured to guide the inflation gas G, which is discharged from the inflator 13, toward the front seat protection part 35 and the rear seat protection part 36, which are arranged below the gas guide flow path 33. In the embodiment, at a location which is deviated slightly in front of the center of the gas guide flow path 33 in the front and rear direction (corresponding to the substantial center of the inflation shielding section 20 in the front and rear direction), the connector part 34, which is intended to be connected to the inflator 13, is arranged to be communicated with the gas guide flow path 33 and to protrude upward from the gas guide flow path 33. In the embodiment, the connector part 34 is inclinedly formed so that a rear side thereof is raised relative to the gas guide flow path 33, and a rear end 34a is opened to allow the inflator 13 to be inserted therein. In addition, the connector part 34 is connected to the inflator 13 by fitting the clamp 16 on the outer periphery thereof while the inflator 13 is inserted therein. In the airbag 19 of the embodiment, an inner tube 62 as a separated body for enhancing heat resistance is arranged on a region extending from the connector part 34 to a part of the gas guide flow path 33, which is located just below the connector part 34 (see FIGS. 2 and 3).

The front seat protection part 35 is laterally arranged with respect to the front seat upon completion of inflation and thus is intended to protect a head of an occupant seated on the front seat when the airbag 19 has been completely inflated during a side collision. As shown in FIG. 5, the front seat protection part 35 has a region protruding slightly below the belt line BL upon completion of inflation. The rear seat protection part 36 is laterally arranged with respect to the rear seat upon completion of inflation and thus is intended to protect a head of an occupant seated on the rear seat when the airbag 19 has been completely inflated during a side collision. The rear seat protection part 36 is configured so that, when the airbag 19 has been completely inflated, a lower edge thereof is substantially coincided with the belt line BL (see FIG. 5). The front seat protection part 35 and the rear seat protection part 36 are configured so that inflation thereof is completed within 20 to 30 ms since the inflator 12 has been activated by detection of the side collision of the vehicle V.

The front sub-inflation portion 22 is arranged adjacent to the front side of the main inflation portion 21 (the front seat protection part 35), and as shown in FIG. 5, is configured so that, upon completion of inflation, a lower edge thereof is substantially coincided with the belt line BL. In the embodiment, the front sub-inflation portion 22 is communicated with the gas guide flow path 33 of the main inflation portion 21 by the upstream-side communication part 38 opened toward a rear and upper side thereof. The upstream-side communication part 38 has a reduced opening width dimension h1 (opening area, see FIG. 2), so that the start of flowing of the inflation gas G thereinto is delayed relative to that in the front seat protection part 35. Specifically, the opening width dimension h1 (opening area) of the upstream-side communication part 38 is set so that the start of flowing of the inflation gas G thereinto is delayed relative to that in the front seat protection part 35 and thus the front sub-inflation portion 22 is completely inflated by the inflation gas G flowed thereinto during 70 to 80 ms after the activation start of the inflator 13.

As shown in FIG. 2, the rear sub-inflation portion 23 is arranged adjacent to the front side of the rear seat protection part 36 as the main inflation portion 21, in a substantially rear half of a region between the front seat protection part 35 and the rear seat protection part 36, at a location on the main inflation portion 21, which is located below the gas guide flow path 33 and also in front of the rear seat protection part 36. In the embodiment, the rear sub-inflation portion 23 is communicated with the rear seat protection part 36 of the main inflation portion 21 by the upstream-side communication part 39 opened toward the rear end thereof. Like the upstream-side communication part 38 arranged on the front sub-protection portion 22, the upstream-side communication part 39 is also set to have a reduced opening width dimension h2 (opening area, see FIG. 2) and thus is configured so that the start of flowing of the inflation gas G thereinto is delayed relative to that in the rear seat protection part 36 and thus the rear sub-inflation portion 23 is completely inflated by the inflation gas G flowed thereinto during 70 to 80 ms after the start of the inflator 13. In the embodiment, the opening width dimension h2 in the upstream-side communication part 39 is set to be slightly larger than that in the upstream-side communication part 38. However, the reason is that the upstream-side communication part 39 is arranged on the front end side of the rear seat protection part 36 and thus, direct insertion of the inflation gas therethrough is difficult than that in the upstream-side communication part 38 arranged in front of the gas guide flow path 33.

As shown in FIGS. 3 to 5, the overlap inflation section 25 when the airbag 19 has been completely inflated is arranged substantially along the front and rear direction at the substantial center of the inflation shielding section 20 in the upward and downward direction, and includes two conduit parts 26 and 27 formed to be connected to the front sub-inflation portion 22 and the rear sub-inflation portion 23, and the overlap section body 28 inflated in a generally rod shape along the front and rear direction. In the embodiment, the overlap section body 28 is configured so that a length dimension thereof substantially corresponds to a width dimension of the inflation shielding section 20 in the front and rear direction, and thus is arranged over the substantially entire region of the inflation shielding section 20 in the front and rear direction. In a state where the airbag constitution body 31 is flatly deployed, the conduit parts 26 and 27 are respectively formed to extend downward from the front sub-inflation portion 22 and the rear sub-inflation portion 23. Also, the conduit parts 26 and 27 are respectively partitioned into the front sub-inflation portion 22 and the rear sub-inflation portion 23 by partitioning joint parts 52 and 53 as described below, and communicated with the front sub-inflation portion 22 and the rear sub-inflation portion 23 by the downstream-side communication parts 40 and 41. A width dimension of each of conduit parts 26 and 27 in the upward and downward direction is set considering a folding margin, so that when the overlap inflation section 25 is folded back at the downstream-side communication parts 40 and 41 and then arranged on the inside of the inflation shielding section 20, the overlap section body 28 is arranged at a location which is located slightly below the center of the inflation shielding section 20 in the upward and downward direction. In a state where the airbag constitution body 31 is flatly deployed, the overlap section body 28 is formed to extend along the front and rear direction on the lower edge of the airbag constitution body 31 over the substantially entire region thereof in the front and rear direction.

Also, the overlap inflation section 25 is communicated with the front sub-inflation portion 22 and the rear sub-inflation portion 23 by the downstream-side communication parts 40 and 41, each of which is formed on a proximal side of each of conduit parts 26 and 27. The downstream-side communication parts 40 and 41 are configured so that locations thereof in the upward and downward direction are coincided with each other, and opening areas thereof are set to be smaller than the upstream-side communication parts 38 and 39 for communicating the front sub-inflation portion 22 and the rear sub-inflation portion 23 with the main inflation portion 21 (i.e., the gas guide flow path 33 and the rear seat protection part 36), so that the start of flowing of the inflation gas into the overlap inflation section 25 is delayed relative to those in the front sub-inflation portion 22 and the rear sub-inflation portion 23. Specifically, in a state where the airbag constitution body 31 is flatly deployed, opening width dimensions h3 and h4 of the downstream-side communication parts 40 and 41 (see FIG. 3) are set to be substantially equal to each other and also to be approximately ¼ of the opening width dimension h1 of the upstream-side communication part 38. More specifically, the opening width dimensions h3 and h4 of the downstream-side communication parts 40 and 41 are set so that the overlap inflation section 25 is completely inflated at approximately 1500 ms after the activation start of the inflation 13.

In the airbag constitution body 31, each of slits 29F and 29R formed to allow the overlap section body 28 to be separated from the main inflation portion 21, as shown in FIG. 2, is formed to create continuous cut lines along the front and rear direction in each of the plate-shaped parts 46 and 47. Also, in a state where the airbag constitution body 31 is been flatly deployed, each of slits 29F and 29R is configured so that both front and rear ends thereof are bent upward and thus locations in the upward and downward direction of terminals thereof are arranged to be substantially coincided with a folding line CL (substantially coincided with the partitioning joint parts 52 and 53 as described below) when the overlap inflation section 25 is folded back. Specifically, the slit 29F is formed adjacent to the overlap section body 28 below a region extending from the front seat protection part 35 between the front sub-inflation portion 22 and the rear sub-inflation portion 23 to the gas guide flow path 33 (i.e., the substantially entire region of the plate-shaped part 46 in the front and rear direction). The slit 29R is formed at a location which is located below the rear seat protection part corresponding to the rear side of the rear sub-inflation portion 23 (a region except the rear end of the plate-shaped part 37), but higher than the slit 29F. Also, the slit 29R is configured so that a rear terminal thereof is located slightly in front of the rear edge of the rear seat protection part 36. The overlap inflation section 25 is folded back at the partitioning joint parts 52 and 53 and the downstream-side communication parts 40 and 41, which are arranged on the proximal side of each of the conduit parts 26 and 27, to cover the inside I of the inflation shielding section 20 while forming the folding line CL along the front and rear direction to block the downstream-side communication parts 40 and 41, and in this state, is connected to the inflation shielding section 20 by stitching the front end 28a and the rear end 28b of the overlap section body 28, respectively, to the front edge 20c and the rear edge 20d of the inflation shielding section 20, using a stitching thread. In addition, when the airbag 19 has been completely inflated, the overlap section body 28 is arranged over the substantially entire region of the inflation shielding section 20 in the front and rear direction while having, as a completely inflated shape thereof, the generally rod shape along the front and rear direction, and also arranged in a region covering the inside extending from the windows W1 to the rear pillar RP via the center pillar CP and the window W2, to be overlapped on the inside I with the front sub-inflation portion 22, the front seat protection part 35, the rear sub-inflation portion 23 and the rear seat protection part 36, which correspond to the gas inflow section 32 (inflation section) adapted to be inflated by the inflation gag flowed thereinto. Namely, when the airbag 19 has been completely inflated, the overlap section body 28 is arranged to be overlapped with the center pillar CP and the rear pillar RP arranged adjacent to the front and rear of the window W2, as viewed from the inside.

The non-inflow section 44 includes a peripheral edge joint part 45 constituting an outer peripheral edge of the gas inflow section 32, the plate-shaped parts 46 and 47 arranged in a region of the inflation shielding section 20, the attaching parts 48 for attaching the airbag 19 to the inner panel 2, the partitioning joint parts 50, 51, 52 and 53 arranged in a region of the gas inflow section 32, and thickness regulating parts 54, 55, 56, 57 and 58. In the embodiment, the peripheral edge joint part 45, the partitioning joint parts 50, 51, 52 and 53, and thickness regulating parts 54, 55, 56, 57 and 58 are formed by stitched sites in which the inside wall 32a is stitched to the outside wall 32b using a stitching thread. However, although not shown in detail, a seal material for preventing gas leakage from stitched lines is applied over the entire surface of the stitched sites.

The peripheral edge joint part 45 is arranged to encircle the entire periphery of the gas inflow section 32, except a rear end 34a of the connector part 34. The plate-shaped part 46 is formed for the entire periphery thereof to be encircled by the peripheral edge joint part 45, and, in a state where the airbag constitution body 31 is flatly deployed, is configured to be arranged between the front seat protection part 35 and the rear sub-inflation portion 23, which are located below the gas guide flow path 33 but above the overlap section body 28, and also to allow a lower end thereof to extend between the front seat protection part 35 and the overlap section body 28. In addition, on the plate-shaped part 46, the slit 29F for separating the front part of the overlap section body 28 from the main inflation portion 21 as described above is formed over the substantially entire region of the lower edge thereof in the front and rear direction. The plate-shaped part 47 is formed for the periphery thereof to be encircled by the peripheral edge joint part 45, and is configured to extend from the rear edge of the flatly deployed airbag constitution body 31 through between the rear seat protection part 36 and the overlap section body 28. As described above, the slit 29R for separating the rear part of the overlap section body 28 from the main inflation portion 21 is formed on the plate-shaped part 47, except a rear end region thereof. The attaching parts 38 are intended to attach an upper edge 20a of the inflation shielding section 20 to the inner panel 2 of the body 1 of the vehicle V, and are arranged in plural (in the embodiment, five attaching parts) along the front and rear direction. Each of attaching parts 38 is provided with an attaching hole (the reference numeral thereof is omitted) allowing the attaching bolt 11 to be inserted therein. In the embodiment, each of attaching parts 48 is arranged so that a thing formed by a woven fabric made of polyamide yarn, polyester yarn or the like, as a separate body from the airbag constitution body 31, protrudes from the upper edge 20a of the inflation shielding section 20 with a proximal side thereof stitched to the upper edge 20a of the inflation shielding section 20 (see FIGS. 3 and 4).

The partitioning joint part 50 is formed as a generally rod shape extending upward from a portion of the peripheral edge joint part 45, which is located on the front end side of the plate-shaped part 46, to partition between the front sub-inflation portion 22 and the front seat protection part 35. The partitioning joint part 50 is formed so that a distal end thereof protrudes more upward than the partitioning joint part 51. The partitioning joint part 51 is configured to extend rearward from a portion of the peripheral edge joint part 45, which defines a peripheral edge of the plate-shaped part 46, to be continued from an upper edge of the plate-shaped part 46, and thus to orient a rear end 51a thereof rearward and downward, thereby defining a lower edge of the gas guide flow path 33 and also partitioning between the gas guide flow path 33 and the rear sub-inflation portion 23. The partitioning joint part 52 is formed as a generally rod shape extending forward from a portion of the peripheral edge joint part 45, which defines a front edge of the plate-shaped part 46, to partition between the front sub-inflation portion 22 and the conduit part 26 of the overlap inflation section 25. The partitioning joint part 52 is configured to provide a gap between a front end 52a thereof and the peripheral edge joint part 45 disposed in front thereof. The partitioning joint part 55 is formed as a generally rod shape extending forward from a portion of the peripheral edge joint part 45, which defines a front edge of the plate-shaped part 47, to partition between the rear sub-inflation portion 23 and the conduit part 27 of the overlap inflation section 25. The partitioning joint part 53 is configured to provide a gap between a front end 53a thereof and a portion of the peripheral edge joint part 45 disposed in front thereof, which defines a periphery of the plate-shaped part 46. Also, in the embodiment, the partitioning joint parts 52 and 53 are arranged so that locations thereof in the upward and downward direction are substantially coincided with each other. In the airbag 19 according to the embodiment, a gap between the partitioning joint part 50 and an upper edge of the peripheral edge joint part 45 forms the upstream-side communication part 38, and a gap between the rear end 51a of the partitioning joint part 51 and a front upper end of the plate-shaped part 47 forms the upstream-side communication part 39. In addition, a gap between the front end 52a of the partitioning joint part 52 and a front edge of the peripheral edge joint part 45 forms the downstream-side communication part 40, and a gap between the front end 53a of the partitioning joint part 53 and a rear edge of the peripheral edge joint part 45 forms the downstream-side communication part 41.

The thickness regulating part 54 has a generally circular exterior shape and is arranged at a location, which is located adjacent to the front end of the gas guide flow path 33 and in rear of the upstream-side communication part 38. The thickness regulating part 54 is provided such that, during inflation of the main inflation portion 21, a great quantity of inflation gas is prevented from flowing toward the upstream-side communication part 38 (i.e., the front sub-inflation portion 22) and a front upper portion of the front seat protection part 35, which is integrally formed with the gas guide flow path, is prevented from being thickly inflated. The thickness regulating part 55 is arranged in a region of a lower edge of the front seat protection part 35, which protrudes below the belt line BL (see FIG. 5), and is formed in a generally flat T-shaped exterior shape to protrude upward from a portion of the peripheral edge joint part 45, which defines the upper edge of the plat-shaped part 46. The thickness regulating part 56 extends forward from a portion of the peripheral edge joint part 45, which defines the periphery of the plate-shaped part 46, to be connected to the upper edge of the plate-shaped part 46 and the partitioning joint part 51, and on a distal end side thereof, a generally circular-shaped partitioned part 56a for regulating a thickness of the front seat to protection part 35 is arranged. The thickness regulating part 57 is formed to protrude forward from a portion of the peripheral edge joint part 45, which defines the outer periphery of the plate-shaped part 46, below the thickness regulating part 56, thereby regulating a thickness of a rear edge of the front seat protection part 35. The thickness regulating part 58 is arranged in a region of the rear seat protection part 36, to have a generally flat V-shaped exterior shape and also to protrude an upper end thereof more upward than the portioning joint 51.

In the airbag 19 according to the embodiment, a connection belt 61, as a separate body from the airbag constitution body 31, is arranged on the front edge of the inflation shielding section 20 (see FIGS. 2 and 3). Like the airbag constitution body 31, the connection belt 61 is formed by a woven fabric made of polyamide yarn, polyester yarn or the like, and is arranged to protrude forward with a proximal side thereof stitched to a portion of the front edge of the inflation shielding section 20, which is located slightly below the center thereof in the upward and downward direction. A distal end side of the connection belt 61, like the attaching parts 48, is intended to be attached and fixed to the inner panel 2 of the body 1, using the bracket 10 and the bolt 11, and thus has an inserting hole (the reference numeral thereof is omitted) allowing the attaching bolt 11 to be inserted therein.

Next, procedures of mounting the head protection airbag apparatus M of the embodiment in the vehicle V will be described. The attaching parts 38 and the connection belt 61 are stitched to the airbag constitution body 31, and then the inside wall 32a and the outside wall 32b are overlapped with each other and flatly deployed. Each of conduit parts 26 and 27 of the overlap inflation section 25 of the airbag constitution body 31 flatly deployed in this way is folded back toward the inside at the folding line CL (see FIG. 2) substantially along the front and rear direction, which extends through the partitioning joint part 52, the downstream-side communication part 40, the partitioning joint part 53 and the downstream-side communication part 41, and thus, the front end 28a and the rear end 28b of the overlap section body 28 are arranged to cover the inside. Then, the front end 28a and the rear end 28b of the overlap section body 28 are respectively stitched to the front edge 20c and the rear edge 20d of the inflation shielding section 20. Next, the inflation shielding section 20, together with the overlap inflation section 25, is folded to reduce a width dimension thereof in the upward and downward direction, while approaching the lower edge 20b to the upper edge 20a. After being completely folded, the airbag 19 is wrapped by a breakable wrapping material (not shown) for preventing collapsing of the folded state and is placed at a predetermined location. Then, the attaching brackets 10 are respectively attached to each of the attaching parts 48 and the distal end of the connection belt 16. Also, the inflator 13 is connected to the connector part 34 using the clamp 16, and the attaching bracket 14 is attached around the inflator 13, thereby forming an airbag assembly.

Next, each of attaching brackets 10 and 14 is arranged at a predetermined location on the inner panel 2 and is attached and fixed to the inner panel 2 using the attaching bolts 11 and 15. Then, a lead (not shown) extending from a predetermined control device mounted on the vehicle V for activating the inflator is connected to the inflator 13. Subsequently, when the front pillar garnish 4 and the roof head lining 5 constituting the airbag cover 8 is attached to the inner panel 2 of the body 1, and additionally, the pillar garnishes 6 and 7 are attached to the inner panel 2 of the body, the head protection airbag apparatus M can be mounted on the vehicle V.

After the head protection airbag apparatus M is mounted on the vehicle V, if the inflator 13 is activated by receiving an activation signal from the control device upon a front collision or a rollover of the vehicle V, the inflation gas G discharged from the inflator 13 is flowed into the inflation shielding section 20 of the airbag 19. Thus, the inflation shielding section 20, which is being inflated, breaks the wrapping material (not shown), and also pushes and opens the airbag cover 8 constituted of the lower edges 4a and 5a of the front pillar garnish 4 and the roof head lining 5. Then, the inflation shielding section 20, as shown by a two-dot chain line in FIG. 1 and also shown in FIG. 5, is greatly inflated while protruding downward, to cover the insides of the windows W1 and W2, the center pillar CP and the rear pillar RP.

Meanwhile, according to the head protection airbag apparatus M of the embodiment, the main inflation portion 21 in the inflation shielding section 20 of the airbag 19 is firstly inflated as a primary inflation portion by flowing the inflation gas G thereinto, and after the main inflation portion 21 as the primary inflation portion has been completely inflated, the front sub-inflation portion 22 and the rear sub-inflation portion 23 are completely inflated as secondary inflation portions by flowing the inflation gas G thereinto (see FIG. 6). Also, after the front sub-inflation portion 22 and the rear sub-inflation portion 23 as the secondary inflation portions have been completely inflated, the overlap inflation section 25 is completely inflated as a tertiary inflation portion by flowing the inflation gas G thereinto (see FIG. 7)

According to the head protection airbag apparatus M of the embodiment, when the airbag 19 has been completely inflated, the overlap section body 28 of the overlap inflation section 25 is arranged on the inside I of the inflation shielding section 20 so that an inflation region thereof is overlapped with an inflation region (the gas inflow section 32) of the inflation shielding section 20, and the overlap section body 28 of the overlap inflation section 25 has a generally rod-shaped exterior shape and is arranged to extend substantially along the front and rear direction on a substantially middle region of the inflation shielding section 20 in the upward and downward direction. Namely, in the head protection airbag apparatus M of the embodiment, the inflation shielding section 20 is inflated so that the middle region thereof in the upward and downward direction is substantially thickly inflated by arranging the overlap section body 28 of the overlap inflation section 25 thereon. Also, because the overlap section body 28 of the overlap inflation section 25 is inflated in the rod shape and arranged substantially along the front and rear direction, the overlap section body 28 of the overlap inflation section 20 becomes an aspect having rigidity and thus is not easily bended even when supporting a head MH of an occupant MP. In addition, because the overlap section body 28 of the overlap inflation section 25 is arranged to be overlapped with the center pillar CP and the rear pillar RP arranged adjacent to the window W2 as viewed from the inside I, the outside O thereof can be indirectly supported by the center pillar CP and the rear pillar RP with the inflation shielding section 20 interposed therebetween, when supporting the head MH of the occupant MP. Further, because the overlap inflation section 25 is configured to be completely inflated after the inflation shielding section 20 has been completely inflated, upon a rollover, in which a timing of supporting the occupant is relatively slow, the head MH of the occupant MP moving toward the outside O can be accurately restrained over a wide area in the front and rear direction by the overlap section body 28 arranged in the rod shape along the front and rear direction with the outside O thereof supported by the center pillar CP and the rear pillar RP. Therefore, the head protection airbag apparatus of the embodiment can accurately restrain the head MH of the occupant MP upon a rollover, even if the lower edge thereof upon completion of inflation is not located below the belt line BL.

Accordingly, the head protection airbag apparatus M of the embodiment can prevent the occupant MP from being moved toward the outside O upon a rollover of the vehicle V even if the lower edge 20b upon completion of inflation is not located below the belt line BL, thereby accurately restraining the occupant MP on the inside I.

Also, according to the head protection airbag apparatus M of the embodiment, when the airbag 19 has been completely inflated, the overlap section body 28 of the overlap inflation section 25 is arranged to be overlapped with the insides I of the center pillar CP and the rear pillar RP respectively arranged adjacent to the front and rear of the window W2. Therefore, the outside O of the overlap section body 28 can be supported on two regions, which are spaced from each other in the front and rear direction, by the center pillar CP and the rear pillar RP arranged in the front and rear, and thus, upon a rollover, the head MH of the occupant MP can be more accurately restrained by the overlap section body 28. Naturally, if this point is not considered, the outside of the overlap section body of the overlap inflation section may be supported only by the center pillar (middle pillar), in front and rear of which windows are arranged.

Further, according to the head protection airbag apparatus M of the embodiment, the overlap section body 28 of the overlap inflation section 25 is arranged over the substantially entire region of the inflation shielding section 20 in the front and rear direction. When the airbag 19 has been completely inflated, the overlap section body 28 of the overlap inflation section 25, which is swelled in a rod shape and has rigidity, is arranged to be overlapped over the entire length in the front and rear direction of the inflation shielding section 20 covering the insides of the windows W1 and W2, and thus an ability of restraining the occupant head can be more enhanced. Naturally, if this point is not considered, the overlap section body of the overlap inflation section may not be arranged over the substantially entire region of the inflation shielding section in the front and rear direction.

Figure 8A:
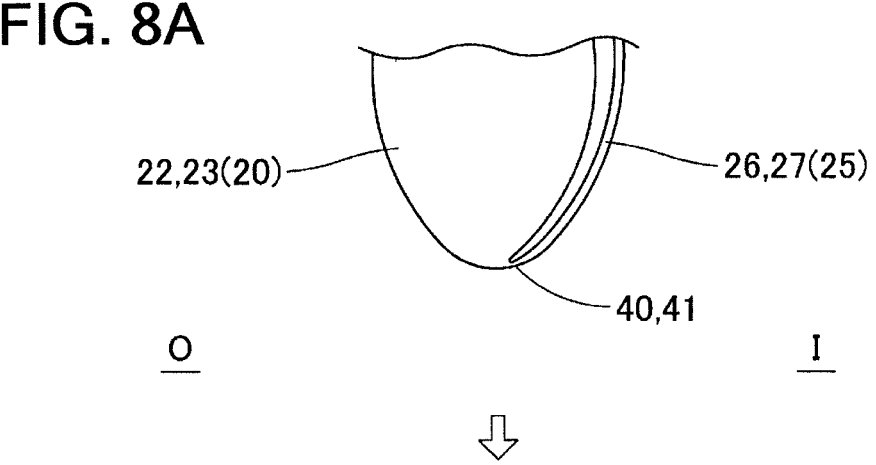
FIGS. 8A to 8C are schematic views explaining an inflation procedure of the overlap inflation section in the head protection airbag apparatus according to the embodiment.
Figure 8B:
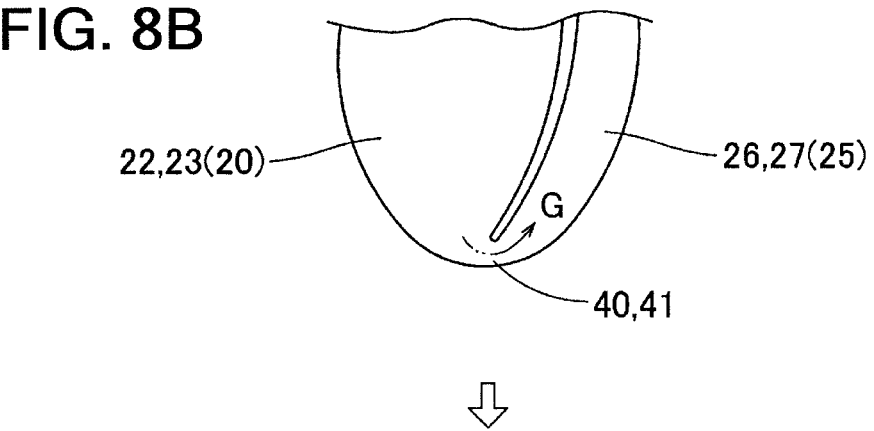
Figure 8C:
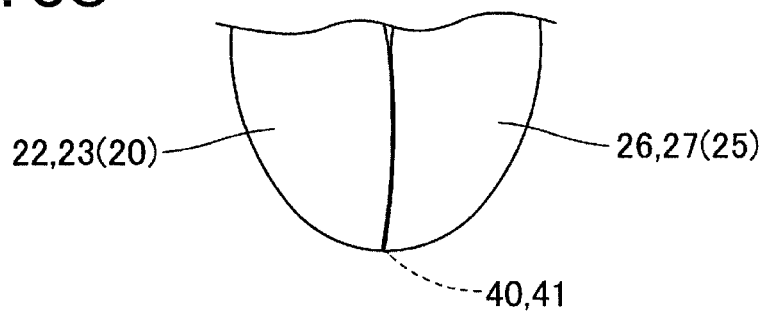

Further, according to the head protection airbag apparatus M of the embodiment, the airbag 19 is constituted of the airbag constitution body 3 in which, in a flatly deployed state thereof, the overlap inflation section 25 is arranged adjacent to the lower side of the inflation shielding section 20 to extend substantially along the front and rear direction, and the overlap inflation section 25 is configured to be communicated with the inflation shielding section 20 through the downstream-side communication parts 40 and 41 and also is folded back at the downstream-side communication parts 40 and 41 to be arranged on the inside I of the inflation shielding section 20. Therefore, because the downstream-side communication parts 40 and 41 are folded back so that it is difficult for the inflation gas to move between the inflation shielding section 20 (i.e., the front sub-inflation portion 22 and the rear sub-inflation section 23) and the overlap inflation section 25, the start of inflation of the overlap inflation section 25 can be securely delayed from the start of inflation of the inflation shielding section 20. Also, as shown in FIGS. 8A to 8C, because the folded parts themselves can serve as non-return valves, once the inflation gas is flowed into the overlap inflation section 25, the inflation gas can hardly move toward the inflation shielding section 20 (i.e., the front sub-inflation portion 22 and the rear sub-inflation section 23). Therefore, upon a rollover, an internal pressure of the overlap inflation section 25 can be sufficiently achieved, and even if an internal pressure of the inflation shielding section 20 is decreased, the head MH of the occupant MP can be accurately restrained by the overlap inflation section 25 (the overlap section body 28). Naturally, if this point is not considered, the overlap inflation section may formed as a separate body from the inflation shielding section and be provided with a communication opening, and thus, by stitching a peripheral edge of the communication opening to the inflation shielding section, the overlap inflation section may be communicated with the inflation shielding section.

In addition, according to the head protection airbag apparatus M of the embodiment, the inflation shielding section 20 includes the main inflation portion 21, the front sub-inflation portion 22 and the rear sub-inflation portion 23, and the front sub-inflation portion 22 and the rear sub-inflation portion 23 are communicated with the main inflation portion 21 and completely inflated after the main inflation portion 21 has been completely inflated. Therefore, as shown in FIG. 6, upon a side collision, when the head MH of the occupant MP is supported by the main inflation portion 21 completely inflated, the inflation gas therein is discharged to the front sub-inflation portion 22 and the rear sub-inflation portion 23, thereby preventing an internal pressure of the main inflation portion 21 from being increased. As a result, the front seat protection part 35 and the rear seat protection part 36 (i.e., the main inflation portion 21) have an adequate reaction force, thereby accurately supporting the head MH of the occupant MP. Also, according to the head protection airbag apparatus M of the embodiment, the overlap inflation section 25 is communicated with the front sub-inflation portion 22 and the rear sub-inflation portion 23, and the downstream-side communication parts 40 and 41 for communicating the overlap inflation section 25 with the front sub-inflation portion 22 and the rear sub-inflation portion 23 are set to have opening areas (opening width dimensions h3 and h4 in the flatly deployed state) smaller than those of the upstream-side communication parts 38 and 39 for communicating the front sub-inflation portion 22 and the rear sub-inflation portion 23 with the main inflation portion 21 (i.e., the gas guide flow path 33 and the rear seat protection part 36). Therefore, even when the inflation gas G is flowed into the front sub-inflation portion 22 and the rear sub-inflation portion 23 upon a side collision, the inflation gas G, which has been flowed into the front sub-inflation portion 22 and the rear sub-inflation portion 23, can be prevented from being immediately flowed into the overlap inflation section 25, so that the start of inflation of the overlap inflation section 25 can be securely delayed from the start of inflation of the front sub-inflation portion 22 and the rear sub-inflation portion 23. Naturally, if these points are not considered, the overlap inflation section may be directly communicated with the main inflation portion without being communicated with sub-inflation portions, and also, the inflation shielding section may be constituted only of the main inflation portion, without having the sub-inflation portions.

Figure 9:
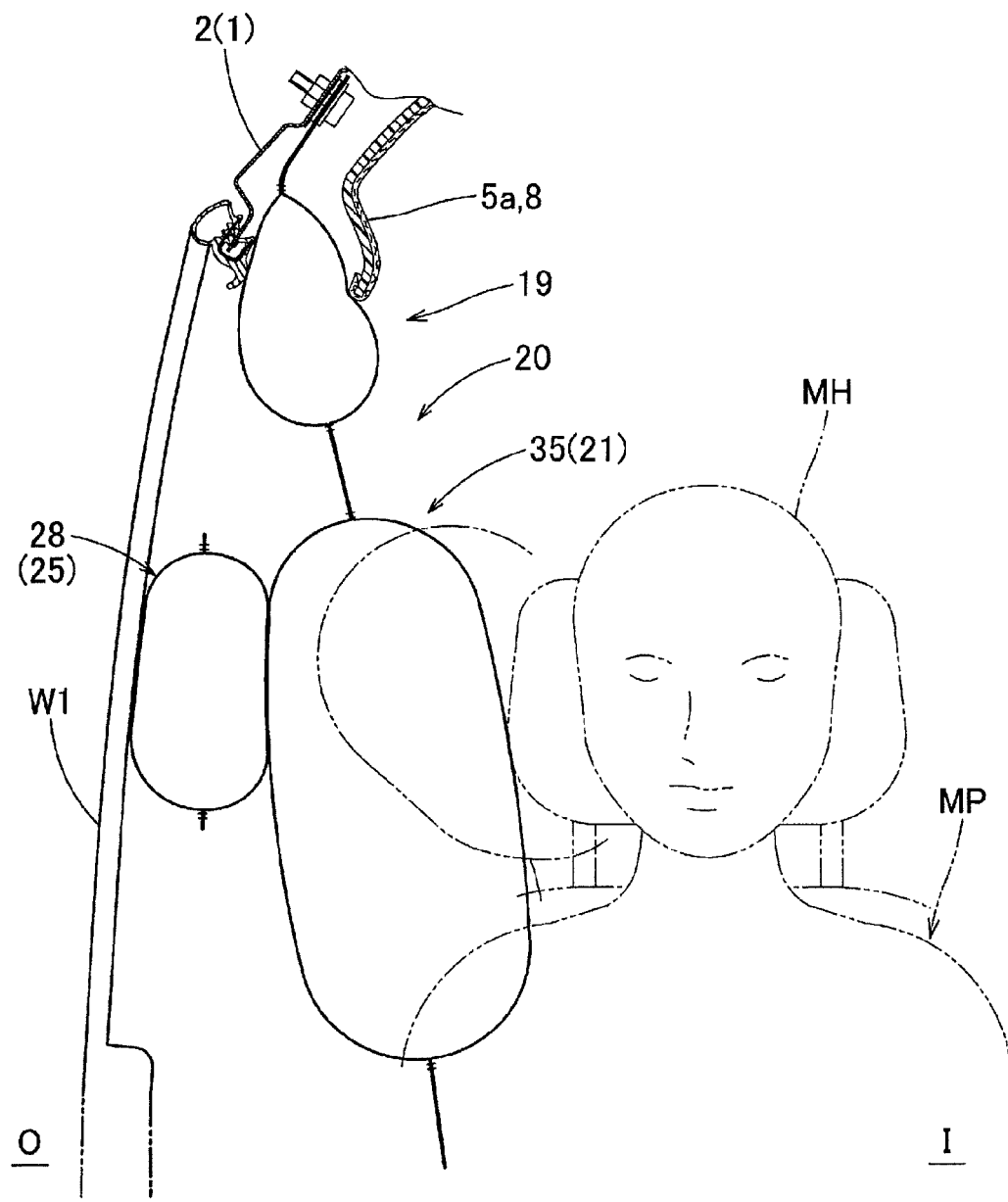
FIG. 9 is a schematic longitudinal sectional view along a left and right direction showing a state where the airbag, in which the overlap inflation section is located on the outside side of the inflation shielding section, is mound in the vehicle and the overlap inflation section is inflated.

Alternatively, although the overlap section body 28 of the overlap inflation section 25 is arranged on the inside I of the inflation shielding section 20 in the embodiment, the overlap inflation section 25 may be folded back at the downstream-side communication parts 40 and 41 toward the outside, so that the overlap section body 28 may be arranged on the outside O of the inflation shieling section 20 (see FIG. 9). If the overlap section body 28 is arranged on the outside O, the overlap section body 28 causes the outside O thereof to be directly supported by the pillar garnishes 6 and 7 constituting the center pillar CP and the rear pillar RP, without interposing the inflation shielding section 20 therebetween. Arranging the overlap inflation section on the inside is preferable in terms of protecting the head of the occupant as quickly as possible upon a rollover of a vehicle, whereas arranging the overlap inflation section on the outside is preferable in terms of protecting the head of the occupant upon a side collision.

In addition, although the head protection airbag apparatus mounted in a two-row seat type vehicle has been described as an example in the embodiment, the head protection airbag apparatus of the present invention may be mounted in a three-row seat type vehicle. In this case, the overlap inflation section may be arranged over three pillars, including middle pillars, which are arranged between three windows, and a rear pillar.

What is claimed is:

1. A head protection airbag apparatus comprising an airbag that is folded and received in an upper edge of a window on an inside of a vehicle, an upper edge of which is attached and fixed to a body of the vehicle, and inflated and protruding downward from a storage region by an inflation gas flowed from an inflator to cover the inside of the window,
wherein the air bag includes:
an inflation shielding section that is arranged to cover the inside of the window upon completion of inflation; and
an overlap inflation section that is communicated with the inflation shielding section and when the airbag is completely inflated, arranged on an inside or an outside of the vehicle of the inflation shielding section so that an inflation region of the overlap inflation section is overlapped with an inflation region of the inflation shielding section inflated by the inflation gas,
wherein the overlap inflation section is configured to be completely inflated after the inflation shielding section is completely inflated,
wherein the overlap inflation section has a generally rod-shaped exterior shape and is arranged to extend substantially along a front and rear direction on a substantially middle region of the inflation shielding section in an upward and downward direction,
wherein the overlap inflation section is arranged to be overlapped with a pillar arranged adjacent to the window, as viewed from the inside of the vehicle, and
wherein the overlap inflation section is arranged over the substantially entire region of the inflation shielding section in the front and rear direction of the vehicle.

2. The head protection airbag apparatus according to claim 1, wherein, when the airbag has been completely inflated, the overlap inflation section is arranged to be overlapped with two pillars respectively arranged adjacent to the front and rear of the windows, as viewed from the inside of the vehicle.

3. The head protection airbag apparatus according to claim 1, wherein an airbag constitution body constituting the airbag is configured so that, in a flatly deployed state of the airbag, the overlap inflation section is arranged adjacent to a lower side of the inflation shielding section to extend substantially along the front and rear direction, and
wherein the overlap inflation section is communicated with the inflation shielding section through a communication part, and folded back at the communication part to be arranged on the inside or the outside of the vehicle of the inflation shielding section.

4. The head protection airbag apparatus according to claim 1, wherein the inflation shielding section includes a main inflation portion and a sub-inflation portion communicated with the main inflation portion to be completely inflated after the main inflation portion is completely inflated,
wherein the overlap inflation section is communicated with the sub-inflation portion, and
wherein a downstream-side communication part for communicating the overlap inflation section with the sub-inflation portion is set to have an opening area smaller than that of an upstream-side communication part for communicating the sub-inflation portion with the main inflation portion.

5. A head protection airbag apparatus comprising an airbag that is folded and received in an upper edge of a window on an inside of a vehicle, an upper edge of which is attached and fixed to a body of the vehicle, and inflated and protruding downward from a storage region by an inflation gas flowed from an inflator to cover the inside of the window,
wherein the air bag includes:
an inflation shielding section that is arranged to cover the inside of the window upon completion of inflation; and
an overlap inflation section that is communicated with the inflation shielding section and when the airbag is completely inflated, arranged on an inside or an outside of the vehicle of the inflation shielding section so that an inflation region of the overlap inflation section is overlapped with an inflation region of the inflation shielding section inflated by the inflation gas, wherein the overlap inflation section is configured to be completely inflated after the inflation shielding section is completely inflated, wherein the overlap inflation section has a generally rod-shaped exterior shape and is arranged to extend substantially along a front and rear direction on a substantially middle region of the inflation shielding section in an upward and downward direction, wherein the overlap inflation section is arranged to be overlapped with a pillar arranged adjacent to the window, as viewed from the inside of the vehicle, wherein an airbag constitution body constituting the airbag is configured so that, in a flatly deployed state of the airbag, the overlap inflation section is arranged adjacent to a lower side of the inflation shielding section to extend substantially along the front and rear direction, and wherein the overlap inflation section is communicated with the inflation shielding section through a communication part, and folded back at the communication part to be arranged on the inside or the outside of the vehicle of the inflation shielding section.

6. A head protection airbag apparatus comprising an airbag that is folded and received in an upper edge of a window on an inside of a vehicle, an upper edge of which is attached and fixed to a body of the vehicle, and inflated and protruding downward from a storage region by an inflation gas flowed from an inflator to cover the inside of the window, wherein the air bag includes:

an inflation shielding section that is arranged to cover the inside of the window upon completion of inflation; and an overlap inflation section that is communicated with the inflation shielding section and when the airbag is completely inflated, arranged on an inside or an outside of the vehicle of the inflation shielding section so that an inflation region of the overlap inflation section is overlapped with an inflation region of the inflation shielding section inflated by the inflation gas, wherein the overlap inflation section is configured to be completely inflated after the inflation shielding section is completely inflated, wherein the overlap inflation section has a generally rod-shaped exterior shape and is arranged to extend substantially along a front and rear direction on a substantially middle region of the inflation shielding section in an upward and downward direction, wherein the overlap inflation section is arranged to be overlapped with a pillar arranged adjacent to the window, as viewed from the inside of the vehicle, wherein the inflation shielding section includes a main inflation portion and a sub-inflation portion communicated with the main inflation portion to be completely inflated after the main inflation portion is completely inflated, wherein the overlap inflation section is communicated with the sub-inflation portion, and wherein a downstream-side communication part for communicating the overlap inflation section with the sub-inflation portion is set to have an opening area smaller than that of an upstream-side communication part for communicating the sub-inflation portion with the main inflation portion.

* * * * *